(12) United States Patent
Reinhardt et al.

(10) Patent No.: US 7,480,897 B2
(45) Date of Patent: Jan. 20, 2009

(54) METHOD AND SYSTEM FOR MANAGING DEVELOPMENT OBJECTS FOR COMPUTER PROGRAM CODE

(75) Inventors: Edmund H. Reinhardt, Scarborough (CA); Stella Luk, Edmonton (CA)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 10/906,872

(22) Filed: Mar. 10, 2005

(65) Prior Publication Data

US 2006/0206865 A1    Sep. 14, 2006

(51) Int. Cl.
*G06F 9/44* (2006.01)
*G06F 12/00* (2006.01)

(52) U.S. Cl. .................. 717/120; 717/121; 717/122; 707/201

(58) Field of Classification Search ......... 717/120–123, 717/168, 114; 715/526, 530; 707/513, 201–204
See application file for complete search history.

(56) References Cited

U.S. PATENT DOCUMENTS

| | | | |
|---|---|---|---|
| 5,506,580 A | 4/1996 | Whiting et al. ............... 341/51 |
| 6,182,281 B1 | 1/2001 | Nackman et al. ............ 717/116 |
| 6,367,068 B1 | 4/2002 | Vaidyanathan et al. ...... 717/143 |
| 2002/0181507 A1 | 12/2002 | Jones ......................... 370/474 |
| 2002/0184264 A1* | 12/2002 | Berg et al. .................. 707/513 |
| 2003/0023615 A1 | 1/2003 | Beged-Dov ................. 707/200 |
| 2003/0074187 A1 | 4/2003 | Ait-Mokhtar et al. .......... 704/9 |
| 2004/0085228 A1 | 5/2004 | Modha ........................ 341/50 |
| 2004/0153994 A1 | 8/2004 | Bates et al. ................. 717/110 |
| 2006/0069989 A1* | 3/2006 | Jones et al. ................. 715/526 |
| 2006/0080603 A1* | 4/2006 | Bailey et al. ................ 715/530 |

* cited by examiner

*Primary Examiner*—Lewis A. Bullock, Jr.
*Assistant Examiner*—Jason Mitchell
(74) *Attorney, Agent, or Firm*—Paul Barrett; Hoffman Warnick LLC

(57) ABSTRACT

Method and system for managing development objects for computer program code. One development object comprises source code written in a positional language while the other development object comprises a document object model (DOM) that corresponds to the source code. The two development objects are synchronized using a set of synchronizer objects. In particular, the various character ranges defined by the positional language are used to efficiently map a portion of the source code to a corresponding portion of the DOM. As a result, a synchronizer object can readily update a development object with a modification received for the other development object.

20 Claims, 7 Drawing Sheets

METHOD AND SYSTEM FOR MANAGING DEVELOPMENT OBJECTS FOR COMPUTER PROGRAM CODE

The invention relates generally to managing development objects for computer program code, and more particularly, to an improved solution for maintaining synchronization between source code written in a positional language and a corresponding document object model (DOM).

BACKGROUND ART

A positional language defines the meaning of text by its character position within a line. For example, for the iSeries class of mid range servers offered by International Business Machines Corp. of Armonk, N.Y., an illustrative positional language is the Report Program Generator (RPG). Applications written in RPG read and write data from and to databases and devices such as displays and printers. The interface to these databases and devices is described by a series of lines that is called Data Description Specifications (DDS) which is another illustrative positional language.

In general, positional languages comprise some of the earliest programming languages. More recently, token-based languages (e.g., Java, C++, etc.) have increased in popularity. In either case, the source code is traditionally modified using a text editor. However, Integrated Development Environments (IDEs) for various programming languages have been enhanced to provide the user with a more productive, intuitive development environment. These enhancements rely on the generation of a document object model (DOM) that corresponds to the source code. In particular, a parser for a compiler included in the IDE can be used to translate source code in a particular programming language into the DOM. The DOM comprises a representation of the source code that captures all of the semantic information included in the source code. When compiling, the DOM is used to generate the program product.

The IDE uses the DOM to provide various enhancements to the user. For example, the DOM can be used to generate one or more graphical views that enable the user to visualize aspects of the language. To this extent, the IDE can display an outline of a program product being developed, an accurate representation of a screen and/or report being developed, etc. Further, the IDE can provide one or more visual editors that are more user-friendly, such as a properties view, a graphical editor, or the like. In this case, it is desirable to allow the user to readily switch between the source code editor and the visual editor.

The visual editors modify data in the DOM. As a result, the IDE must maintain synchronization between the source code and the DOM. To date, an incremental compiler is typically used. In particular, the incremental compiler re-parses modified source code and updates the DOM and/or regenerates affected source code after the DOM is modified. Typically, a token-based parsing of the source code is performed and the result is merged with the existing DOM. Since this operation can be complex, there may be performance problems, such as a user-perceptible delay between modifying the DOM/source code and seeing the change reflected in the corresponding source code/DOM. Further, the incremental compiler can be error-prone and expensive to maintain.

However, for a positional language, synchronization between the DOM and source code can be more efficiently maintained. To this extent, a need exists for an improved solution for maintaining synchronization between source code written in a positional language and a DOM that uses the character position of data in the source code to simplify the synchronization process.

SUMMARY OF THE INVENTION

The invention provides a solution for managing development objects for computer program code. In particular, the invention uses a set (one or more) of synchronizer objects to synchronize data for a development object that comprises source code written in a positional language with data for a development object that comprises a document object module (DOM) that corresponds to the source code. In one embodiment, the DOM includes a model object for each line in the source code, and each model object includes a set of attributes, each of which corresponds to a character range of the line that is defined by the positional language. When a modification to the source code is received, a synchronizer object can update the appropriate attribute of the corresponding model object based on the location of the modification. Similarly, when a modification to an attribute of a model object is received, the synchronizer object can update the appropriate line and character range in the source code based on the attribute's corresponding character range and the model object's corresponding line. To this extent, the synchronizer objects provide an efficient solution for synchronizing source code and a corresponding DOM. Additionally, the synchronizer objects can generate the DOM based on the source code and/or generate the source code based on the DOM. As a result, the invention provides a solution for managing development objects for computer program code that takes advantage of various aspects of a positional language.

A first aspect of the invention provides a method of managing development objects for computer program code, the method comprising: obtaining a first development object that comprises source code for the computer program code, wherein the source code is written in a positional language and includes a set of lines; obtaining a second development object that comprises a document object model (DOM), wherein the DOM includes a set of model objects that corresponds to the set of lines; and using a set of synchronizer objects to synchronize the source code and the DOM based on a set of character ranges defined by the positional language.

A second aspect of the invention provides a method of managing development objects for computer program code, the method comprising: obtaining a first development object that comprises source code for the computer program code, wherein the source code is written in a positional language and includes a set of lines; obtaining a second development object that comprises a document object model (DOM) that corresponds to the source code, wherein the DOM includes: a set of model objects, wherein each model object corresponds to a unique one of the set of lines; and a set of attributes for each model object, wherein each attribute in the set of attributes corresponds to a character range of the corresponding line; and using a set of synchronizer objects to synchronize the source code and the DOM, wherein each synchronizer object in the set of synchronizer objects corresponds to a unique model object in the set of model objects.

A third aspect of the invention provides a system for managing development objects for computer program code, the system comprising: a system for obtaining a first development object that comprises source code for the computer program code, wherein the source code is written in a positional language and includes a set of lines; a system for obtaining a second development object that comprises a document object model (DOM), wherein the DOM includes a set of model objects that corresponds to the set of lines; and a system for using a set of synchronizer objects to synchronize the source code and the DOM based on a set of character ranges defined by the positional language.

A fourth aspect of the invention provides a program product stored on a computer-readable medium, which when executed, manages development objects for computer program code, the program product comprising: program code for obtaining a first development object that comprises source code for the computer program code, wherein the source code is written in a positional language and includes a set of lines; program code for obtaining a second development object that comprises a document object model (DOM), wherein the DOM includes a set of model objects that corresponds to the set of lines; and program code for using a set of synchronizer objects to synchronize the source code and the DOM based on a set of character ranges defined by the positional language.

A fifth aspect of the invention provides a method of deploying an application for managing development objects for computer program code, the method comprising: providing a computer infrastructure being operable to: obtain a first development object that comprises source code for the computer program code, wherein the source code is written in a positional language and includes a set of lines; obtain a second development object that comprises a document object model (DOM), wherein the DOM includes a set of model objects that corresponds to the set of lines; and use a set of synchronizer objects to synchronize the source code and the DOM based on a set of character ranges defined by the positional language.

A sixth aspect of the invention provides computer software embodied in a propagated signal for managing development objects for computer program code, the computer software comprising instructions to cause a computer system to perform the following functions: obtain a first development object that comprises source code for the computer program code, wherein the source code is written in a positional language and includes a set of lines; obtain a second development object that comprises a document object model (DOM), wherein the DOM includes a set of model objects that corresponds to the set of lines; and use a set of synchronizer objects to synchronize the source code and the DOM based on a set of character ranges defined by the positional language.

A seventh aspect of the invention provides a computer-readable medium that includes computer program code to enable a computer infrastructure to manage development objects for computer program code.

An eighth aspect of the invention provides a business method for managing development objects for computer program code.

A ninth aspect of the invention provides a method of generating a system for managing development objects for computer program code.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing development objects for computer program code. In particular, the invention uses a set (one or more) of synchronizer objects to synchronize data for a development object that comprises source code written in a positional language with data for a development object that comprises a document object module (DOM) that corresponds to the source code. In one embodiment, the DOM includes a model object for each line in the source code, and each model object includes a set of attributes, each of which corresponds to a character range of the line that is defined by the positional language. When a modification to the source code is received, a synchronizer object can update the appropriate attribute of the corresponding model object based on the location of the modification. Similarly, when a modification to an attribute of a model object is received, the synchronizer object can update the appropriate line and character range in the source code based on the attribute's corresponding character range and the model object's corresponding line. To this extent, the synchronizer objects provide an efficient solution for synchronizing source code and a corresponding DOM. Additionally, the synchronizer objects can generate the DOM based on the source code and/or generate the source code based on the DOM. As a result, the invention provides a solution for managing development objects for computer program code that takes advantage of various aspects of a positional language.

As used herein, the term "development object" includes source code that is used to generate the computer program code. In one embodiment, the source code is stored in one or more files in a file system. In this case, each file could comprise a development object. Additionally, a development object can comprise one or more in-memory objects that are not stored as files. For example, a development object can comprise one or more in-memory objects that correspond to the source code. To this extent, a document object model (DOM) comprises a development object. It is understood that various other objects can comprise development objects. For example, a development object can comprise an object file that is generated based on source code and/or provided as a library/component, an executable file that comprises the computer program code, and/or the like.

Figure 1:
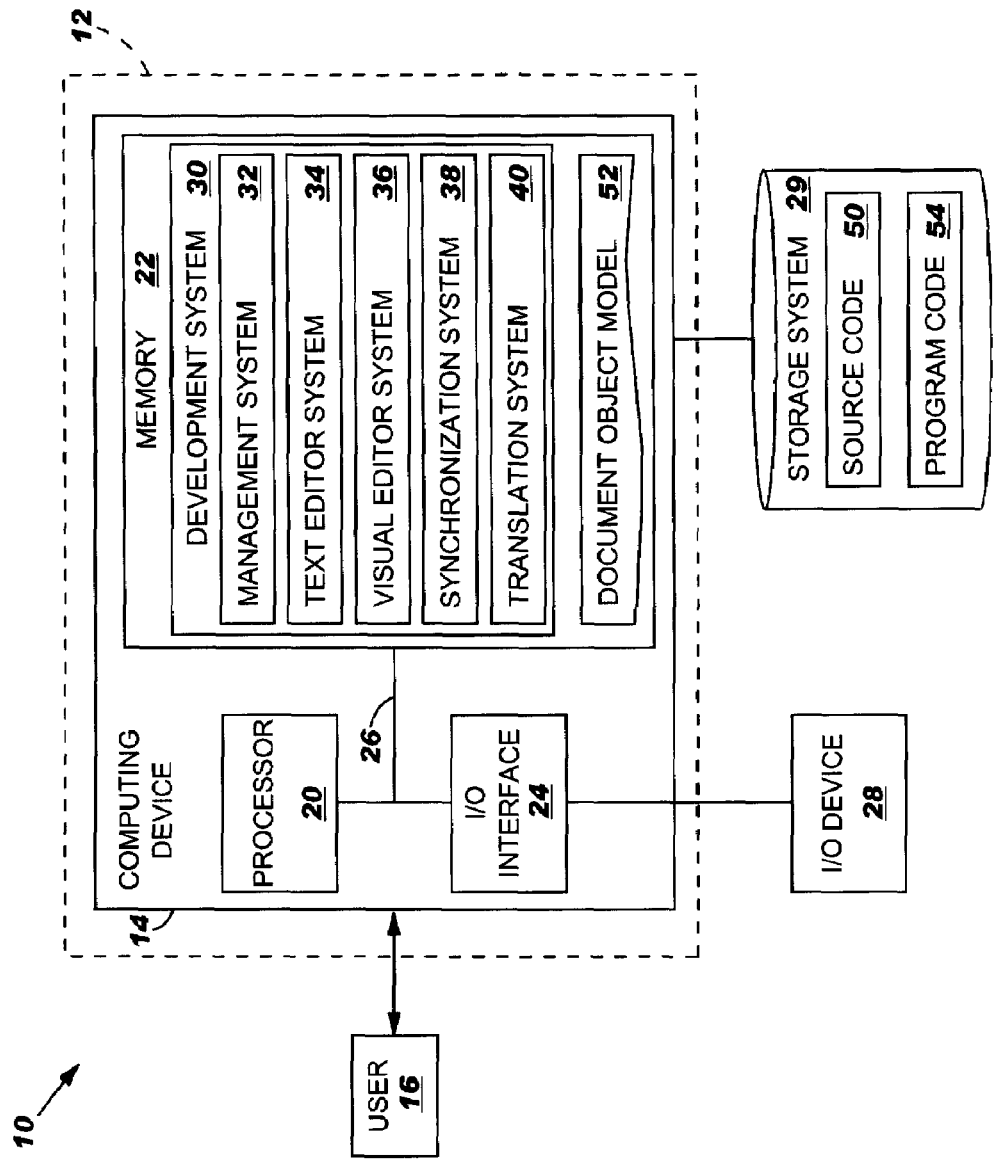
FIG. 1 shows an illustrative system for managing development objects for computer program code.

Turning to the drawings, FIG. 1 shows an illustrative system 10 for managing development objects for computer program code 54. To this extent, system 10 includes a computer infrastructure 12 that can perform the various process steps described herein for managing the development objects. In particular, computer infrastructure 12 is shown including a computing device 14 comprising a development system 30 that enables computing device 14 to manage the development objects by performing the process steps of the invention.

Computing device 14 is shown including a processor 20, a memory 22, an input/output (I/O) interface 24, and a bus 26. Further, computing device 14 is shown in communication with an external I/O device/resource 28 and a storage system 29. In general, processor 20 executes computer program code, such as development system 30, that is stored in memory 22 and/or storage system 29. While executing computer program code, processor 20 can read and/or write data, such as source code 50, to/from memory 22, storage system 29, and/or I/O interface 24. Bus 26 provides a communication link between each of the components in computing device 14. I/O device 28 can comprise any device that enables user 16 to interact with computing device 14 (e.g., keyboard, pointing device, display, etc.) or any device that enables computing device 14 to communicate with one or more other computing devices (e.g., network card, modem, wireless communications device, etc.).

In any event, computing device 14 can comprise any general purpose computing article of manufacture capable of executing computer program code installed by a user 16 (e.g., a personal computer, server, handheld device, etc.). However, it is understood that computing device 14 and development system 30 are only representative of various possible computing devices that may perform the various process steps of the invention. To this extent, in other embodiments, computing device 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over a network, via a shared memory, or the like, to perform the various process steps of the invention. In the former case, the network can comprise one or more types of networks (e.g., the Internet, a wide area network, a local area network, a virtual private network, etc.), and communications between the computing devices may utilize various types of communications links and/or transmission techniques (e.g., wired, wireless, etc.).

As previously mentioned and discussed further below, development system 30 enables computing device 14 to manage development objects (e.g., source code 50, DOM 52, etc.) for computer program code 54. To this extent, development system 30 is shown including a management system 32 that enables user 16 to manage (e.g., add, delete, etc.) various development objects associated with computer program code 54, a text editor system 34 that generates a text editor that enables user 16 to modify source code 50, a visual editor system 36 that generates a visual editor that enables user 16 to modify DOM 52, a synchronization system 38 that maintains synchronization between source code 50 and the corresponding DOM 52, and a translation system 40 that generates computer program code 54. Operation of each of these systems is discussed further below. However, it is understood that some of the various systems shown in FIG. 1 can be implemented independently, combined, and/or stored in memory for one or more separate computing devices 14 that communicate over a network. Further, it is understood that some of the systems and/or functionality may not be implemented, or additional systems and/or functionality may be included as part of system 10.

In one embodiment, development system 30 is embodied as an integrated development environment (IDE) application for a positional language. The IDE application provides a single user interface that allows user 16 to create and modify source code 50, and generate computer program code 54 based on the positional language and source code 50. In particular, the IDE application typically includes one or more editors for editing source code 50, a debugger that assists user 16 in locating and/or correcting any errors, and a compiler that applies the semantics of the positional language to source code 50 to generate computer program code 54. The compiler typically includes a parser that parses source code 50 to generate a DOM 52, and a back-end that generates computer program code 54 based on DOM 52.

To this extent, management system 32 can obtain a set of development objects that comprise source code 50 that is written based on the rules defined by the programming language. Under the present invention, source code 50 is written in a positional language, e.g., Data Description Specifications (DDS). Regardless, management system 32 can generate and/or display a user interface that enables user 16 to add, remove, delete, and/or modify some or all of the set of development objects that comprise source code 50. For example, management system 32 can define and subsequently manage a project that includes a set of files that comprise source code 50. The set of files then can be used to generate computer program code 54. Management system 32 can enable user 16 to define a new project, add and/or remove files from the set of files, and/or allow user 16 to select to view/edit one or more of the set of files as is known in the art.

Source code 50, which is written in a positional language, includes a set (one or more) of lines. In one embodiment, each line is defined by a carriage return and/or line feed included in the data stored in a file. Regardless, each line includes a number of characters, and the position of a particular character (e.g., the column in which the character appears) defines its meaning. When user 16 selects to view/edit source code 50, management system 32 can request that text editor system 34 generate a source code editor for display to user 16.

Figure 2:
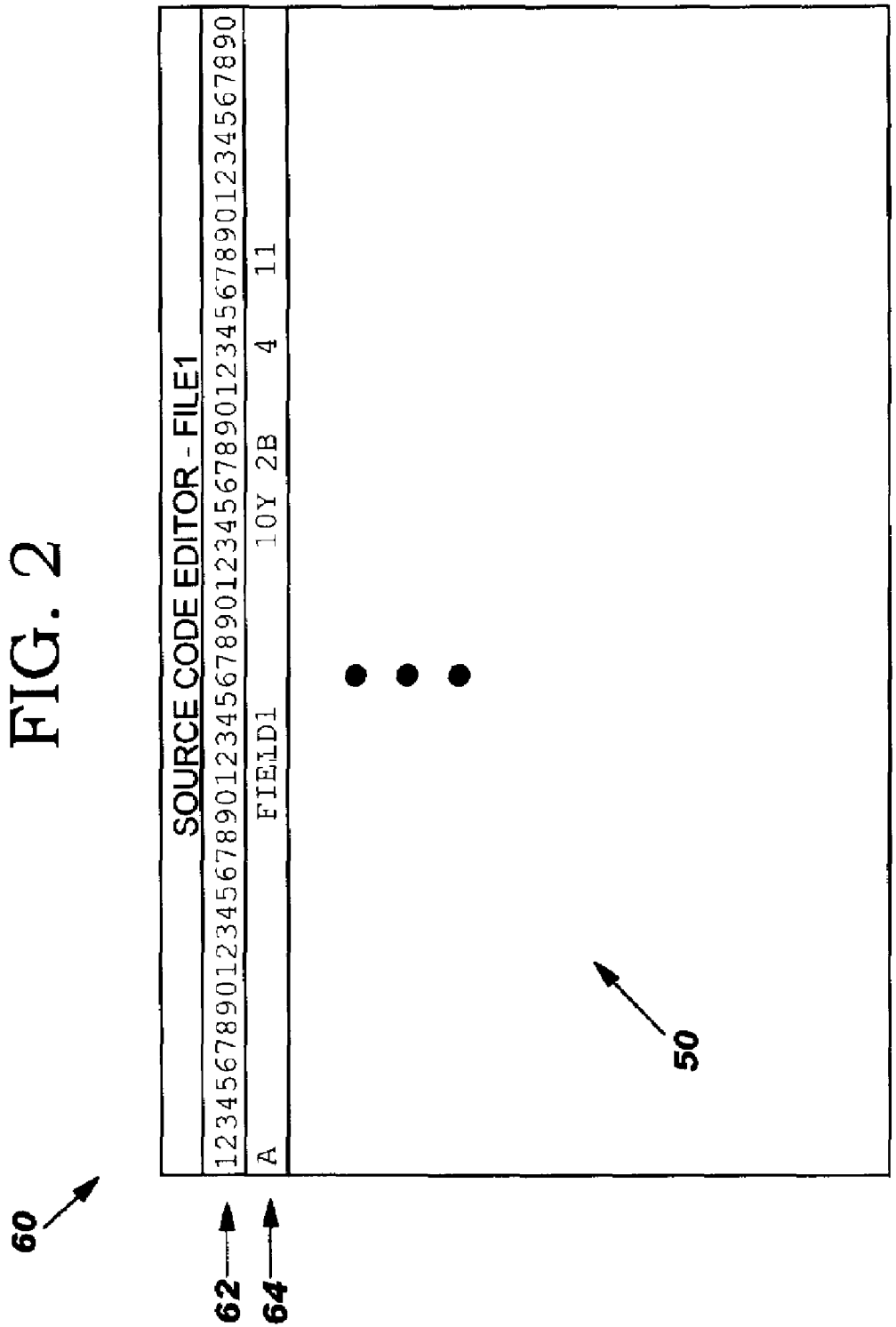
FIG. 2 shows an illustrative source code editor.

For example, FIG. 2 shows an illustrative source code editor 60. Referring to FIGS. 1 and 2, text editor system 34 can generate source code editor 60. Subsequently, source code editor 60 can be displayed to user 16 by text editor system 34 and/or provided to another system (e.g., management system 32) for display as is known in the art. In any event, source code editor 60 enables user 16 to view and/or modify data for the set of lines 64 included in source code 50. To this extent, when modifying the data, user 16 can change the data for one or more existing lines 64, add one or more new lines 64, delete one or more lines 64, etc.

When viewing and/or modifying data for the set of lines 64 using source code editor 60, it is important that user 16 (FIG. 1) know the character position of the data. To this extent, source code editor 60 is shown including a row of column indicators 62 that allows user 16 to readily determine the character position (e.g., column) of particular data. However, it is understood that various alternatives are possible. For example, source code editor 60 could display the current column position of a cursor in a status bar or the like. To further assist user 16 in aligning the data, source code editor 60 typically displays source code 50 using a font in which all characters have a uniform width (e.g., courier).

As previously noted, in a positional language, the particular character position (e.g., column) in which data is located determines its meaning. To this extent, line 64 can comprise an illustrative line of data that is entered based on the DDS positional language. In this case, DDS can define that the first character position is used to indicate the type of line. For example, the blank character in the seventeenth character position can identify line 64 as a defining a field within a record. For the field, there can be several different attributes that define it. In particular, the nineteenth through twenty-eighth character positions can comprise a name for the field, the thirtieth through thirty-fourth character positions can comprise a data length for the field, the thirty-fifth character position can comprise a data type for the field, the thirty-sixth and thirty-seventh character positions can comprise a number of decimal positions for the field, the thirty-eighth character position can comprise the input/output (I/O) usage for the field, etc.

Figure 3:
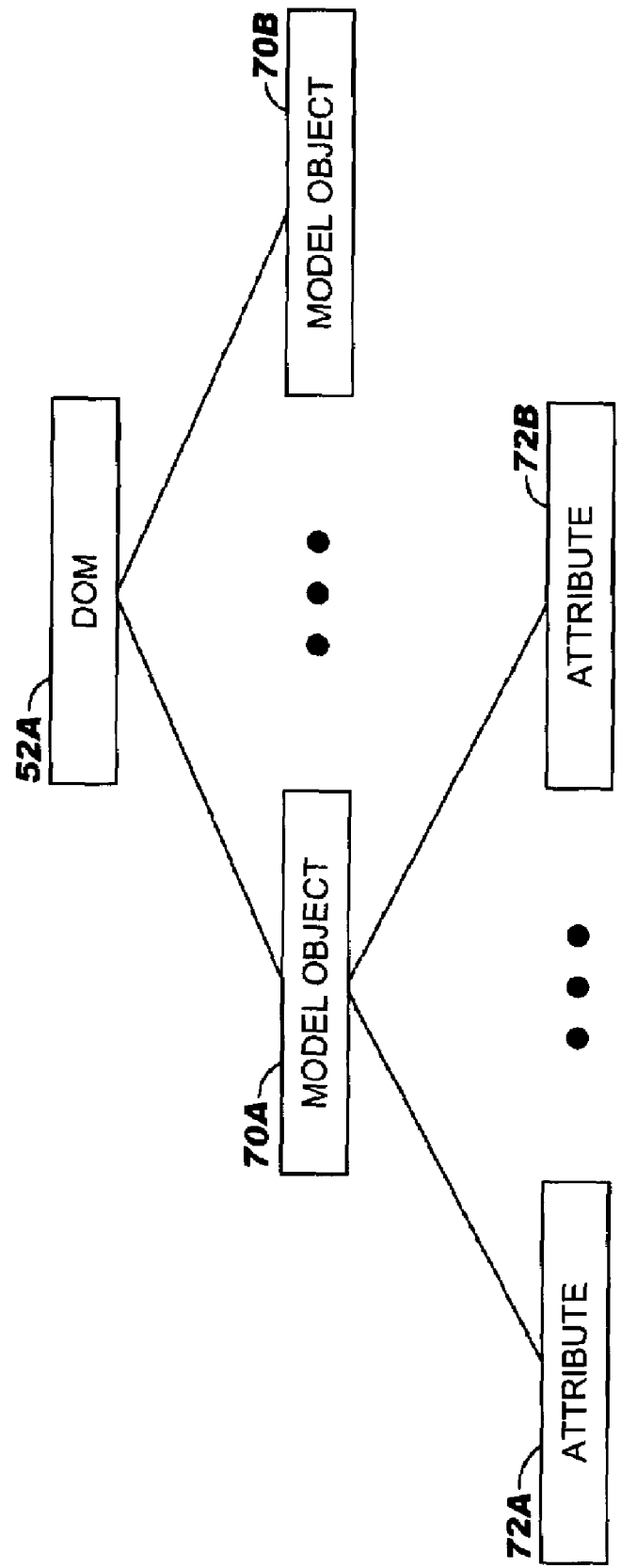
FIG. 3 shows an illustrative structure for a document object model (DOM)

Returning to FIG. 1, a DOM 52 that is based on source code 50 can be obtained. In one embodiment, translation system 40 can comprise a parser or the like that generates DOM 52 based on source code 50. FIG. 3 shows an illustrative structure for a DOM 52A. In particular, DOM 52A comprises a hierarchy of nodes that includes a set of model objects 70A, 70B. The set of model objects 70A-B can correspond to the set of lines 64 (FIG. 2) in source code 50 (FIG. 1). In one embodiment, each model object 70A-B corresponds to a unique line 64 in a one-to-one relationship. However, it is understood that various alternatives are possible, for example, a model object 70A-B could correspond to a plurality of lines 64, a line 64 could correspond to a plurality of model objects 70A-B, and the like. Further, a model object 70A-B can comprise one or more model objects 70A-B that are nested in a hierarchical manner as is known in the art. For example, a model object 70A-B that corresponds to a record can contain a set of model objects 70A-B that correspond to each field in the record.

Further, each model object 70A-B in DOM 52A can include a set of attributes 72A, 72B. To this extent, model object 70A is shown including attributes 72A-B. In one embodiment, each attribute 72A-B can correspond to a character range on the line 64 (FIG. 2) that corresponds to model object 70A. In particular, the character range can comprise the entire character range that defines an attribute having a particular meaning in the positional language.

Figure 4:
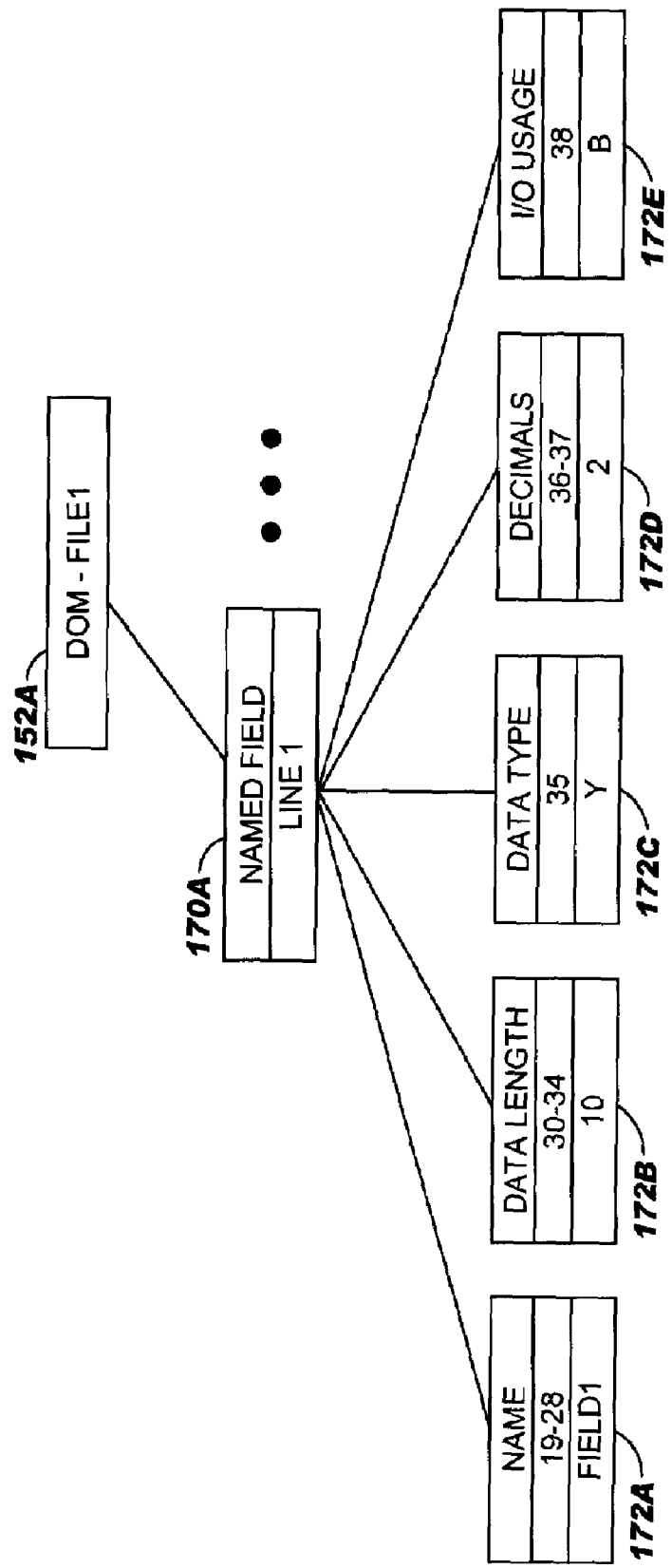
FIG. 4 shows an illustrative DOM having the structure shown in FIG. 3.

To this extent, FIG. 4 shows an illustrative DOM 152A that can be generated based on source code 50. In particular, DOM 152A is shown including a model object 170A that corresponds to line 64 (FIG. 2). As indicated, model object 170A corresponds to a particular type of line 64, e.g., a named field. To this extent, model object 170A can include a set of attributes 172A-E. Each attribute 172A-E includes data for one of the attributes for the type of line 64. For example, each attribute 172A-E can identify the type of attribute (e.g., name, data length, data type, etc.), the character range that corresponds with the attribute, and the data that is stored on line 64 for the character range.

Returning to FIG. 1, once DOM 52 is generated based on source code 50, translation system 40 can generate computer program code 54 based on DOM 52. In particular, translation system 40 can include a back-end that traverses DOM 52 and generates computer program code 54 in a known manner. However, DOM 52 can also be used to assist user 16 in developing source code 50. To this extent, management system 32 can enable user 16 to select alternative display/editing formats based on DOM 52. In particular, management system 32 can enable user 16 to select one or more types of visual editors that enable user 16 to modify and/or view data stored in DOM 52. When selected, management system 32 can request that visual editor system 36 generate the desired visual editor.

Figure 5:
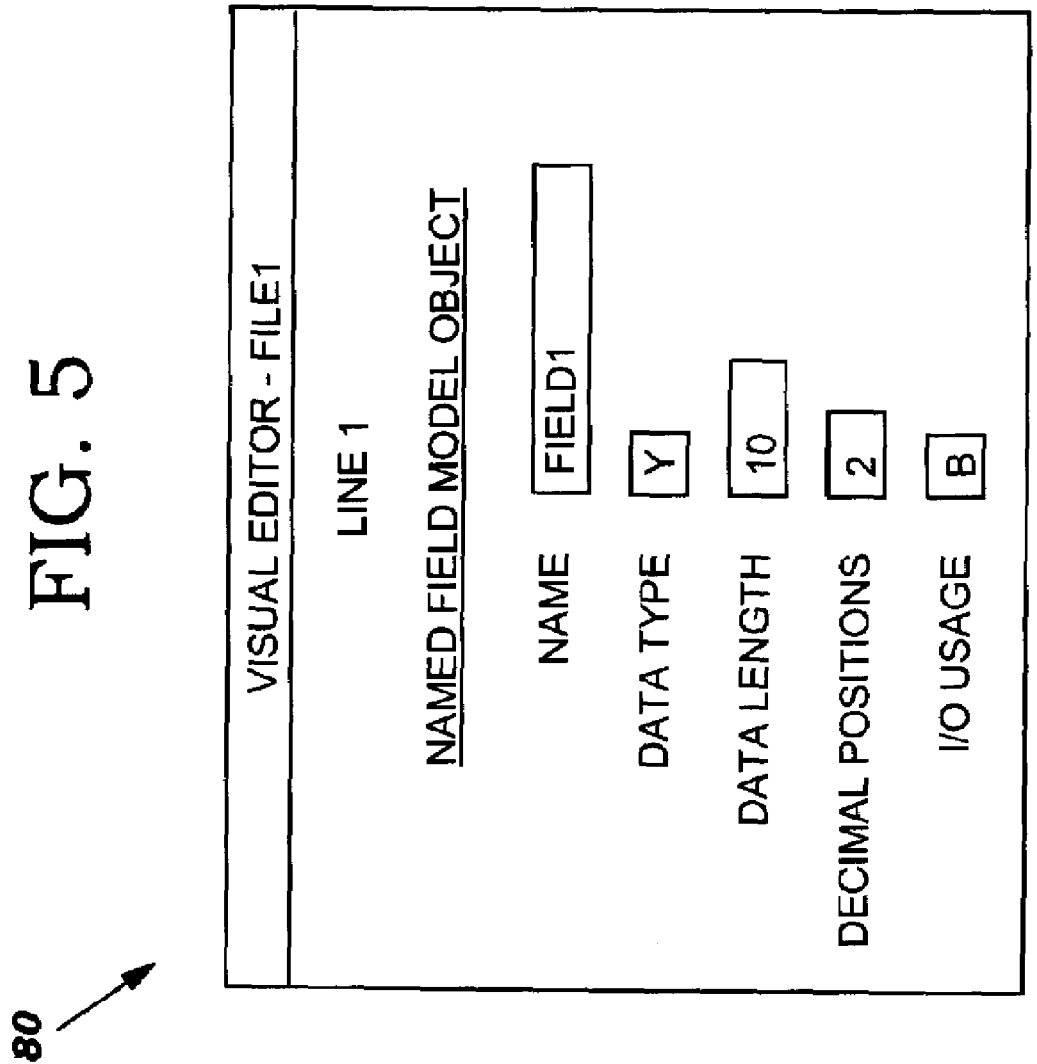
FIG. 5 shows an illustrative visual editor.

For example, FIG. 5 shows an illustrative visual editor 80 that can be generated by visual editor system 36 (FIG. 1). Subsequently, visual editor 80 can be displayed to user 16 (FIG. 1) by visual editor system 36 and/or provided to another system (e.g., management system 32 of FIG. 1) for display as is known in the art. In any event, visual editor 80 can allow user 16 to modify data for attributes 172A-E in DOM 152A of FIG. 4. As shown in FIG. 5, visual editor 80 can include various attribute names and text boxes that enable user 16 (FIG. 1) to view and/or modify data for attributes 172A-E in a user-friendly manner. It is understood that visual editor 80 is only illustrative and various alternative editors/displays could be used as will be apparent to one knowledgeable in the art.

Returning to FIG. 1, since management system 32 can allow user 16 to view and/or modify data for both source code 50 (e.g., using source code editor 60 of FIG. 2) and DOM 52 (e.g., using visual editor 80 of FIG. 5), it is desirable that a modification to one development object be reflected in the other development object. To this extent, the invention provides an efficient solution for synchronizing source code 50 and DOM 52. In particular, synchronization system 38 uses a set of synchronizer objects that synchronize source code 50 and DOM 52 based on a character range in one of the set of lines in source code 60 and a corresponding one of the set of model objects in DOM 52.

Figure 6:
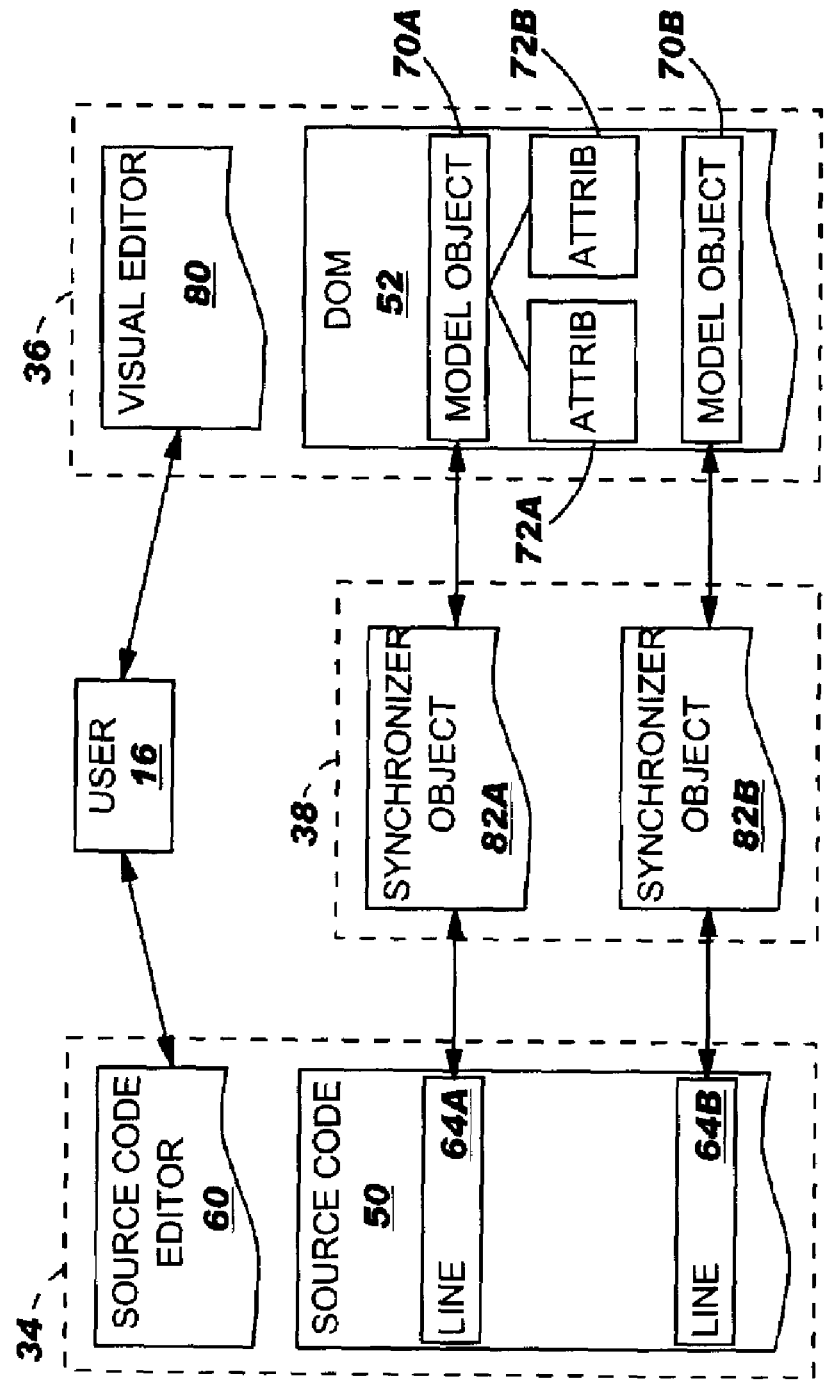
FIG. 6 shows an illustrative data flow for synchronizing development objects that can be implemented by the various systems of FIG. 1.

For example, FIG. 6 shows an illustrative data flow for synchronizing source code 50 and DOM 52 that can be implemented by the various systems of FIG. 1. In particular, as previously discussed, text editor system 34 can generate a source code editor 60 that enables user 16 to modify source code 50. Similarly, visual editor system 36 can generate a visual editor 80 that enables user 16 modify DOM 52. Synchronization system 38 can generate a set of synchronizer objects 82A-B that, upon a modification of either source code 50 or DOM 52, update the other development object based on the modification.

In one embodiment, each synchronizer object 82A-B in the set of synchronizer objects corresponds to a unique model object 70A-B in DOM 52 and a unique line 64A-B in source code 50. In this case, synchronization system 38 can receive a modification of data for one of the set of lines 64A-B in source code 50, and provide the modification to the synchronizer object 82A-B that corresponds to the modified line 64A-B in source code 50. Synchronization system 38 can receive the modification using any of various solutions known in the art. For example, synchronization system 38 can monitor the interaction between user 16 and source code editor 60, monitor messages generated by source code editor 60 that implement the modification in source code 50, receive a message from text editor system 34, and the like.

Based on the modification, synchronizer object 82A-B can select an appropriate attribute 72A-B of the corresponding model object 70A-B that requires updating. For example, synchronizer object 82A-B can initially determine a character position of the modification to line 64A-B. Subsequently, synchronizer object 82 can select the attribute 72A-B that corresponds to a character range that includes the character position. Once selected, synchronizer object 82A-B can update the data for the selected attribute 72A-B with the modified data.

Similarly, synchronization system 38 can receive a modification of data for one of the set of attributes 72A-B, e.g., by monitoring interaction between user 16 and visual editor 80, monitoring messages generated by visual editor 80 that implement the modification in DOM 52, receive a message from visual editor system 36, and the like. Regardless, once the modification is received, synchronization system 38 can obtain the model object 70A-B that corresponds to the modified attribute 72A-B, and provide the modification to the synchronizer object 82A-B that corresponds to the model object 70A-B. Based on the modification, synchronizer object 82A-B can select an appropriate line 64A-B in source code 50 that requires updating. Subsequently, synchronizer object 82A-B can update the data for the selected line 64A-B with the modified data. In particular, synchronization system 82A-B can obtain the character range that corresponds to the modified attribute 72A-B and update the character range on line 64A-B with the modified data.

Figure 7:
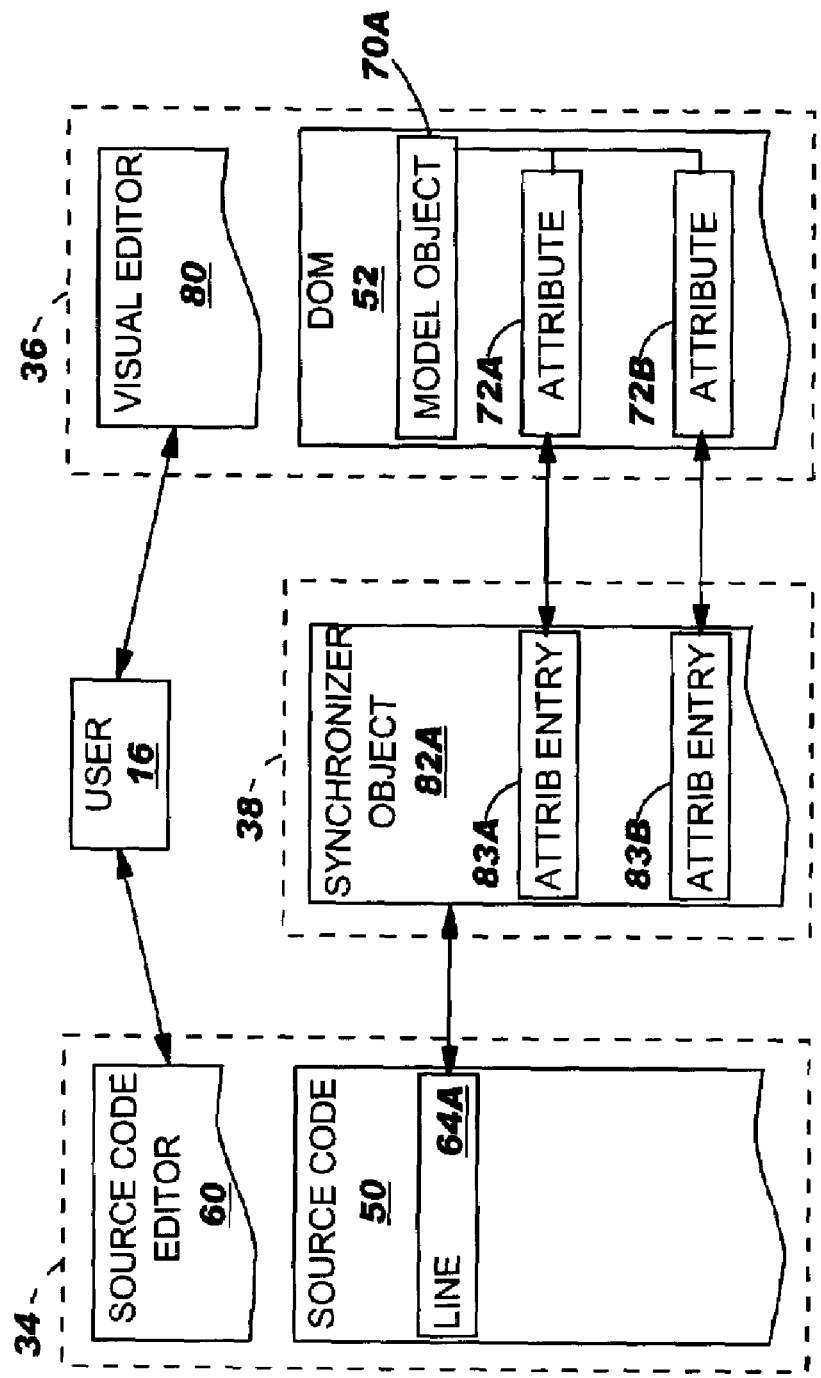
FIG. 7 shows an alternative data flow for synchronizing development objects that can be implemented by the various systems of FIG. 1.

FIG. 7 shows an alternative data flow for synchronizing development objects that can be implemented by the various systems of FIG. 1. In particular, each synchronizer object 82A can comprise a set of attribute entries 83A-B, each of which comprises a mapping between a character range on a corresponding line 64A and an attribute 72A-B in a corresponding model object 70A. In this case, attributes 72A-B of model object 70A can be defined in generic terms (e.g., via a well-defined meta-model). Further, the source code for updating each attribute 72A-B can also be generic. As a result, unique source code does not need to be written to implement each attribute 72A-B. Rather, given a generic attribute identifier, any attribute 72A-B of model object 70A can be generically synchronized with a character range in line 64A. Consequently, synchronizer object 82A can simply become a set of generic attribute entries 83A-B that have been initialized to point to a particular character range on line 64A and a corresponding attribute 72A-B. In one embodiment, a framework for model-driven architecture development, such as the feature identifiers provided by the Eclipse Modeling Framework, can be used to implement this solution.

In addition to maintaining synchronization between source code 50 and DOM 52, synchronization system 38 can use the set of synchronizer objects 82A to generate DOM 52 based on source code 50 and/or generate source code 50 based on DOM 52. For example, synchronization system 38 can receive the data for each line 64A in source code 50, generate a synchronizer object 82A for each line 64A, and provide the data for the line 64A to the synchronizer object 82A. Synchronizer object 82A then can generate a model object 70A and its corresponding set of attributes 72A-B based on the data for the line 64A.

To this extent, synchronization object 82A can determine one of a plurality of types for the line 64A (e.g., based on the data for the seventeenth character position as discussed above). Synchronization object 82A then can select one of a set of model object types in which each model object type corresponds to a unique type of line, and create the new model object 70A having the model object type. Synchronization object 82A can also generate the set of attributes 72A-B associated with the model object type of the new model object 70A. Finally, synchronization object 82A can obtain data for each attribute 72A-B based on the data for the line 64A and the character range for the attribute 72A-B. In particular, synchronization object 82A can determine the character range for an attribute 72A-B, obtain the data for the character range from line 64A, and store the data obtained as the data for the attribute 72A-B.

Additionally, user 16 can request that a new model object 70A be generated using visual editor 80. In this case, synchronization system 38 can generate a new synchronizer object 82A, which in turn can generate the new model object 70A and corresponding attributes 72A-B based on the type of the requested model object 70A. The new model object 70A can include default data for each attribute 72A-B. Further, synchronizer object 82A can create a new line 64A in source code 50 based on the new model object 70A. Subsequently, user 16 can modify the data for one or more attributes 72A-B and synchronizer object 82A can update the data for line 64A based on the modifications.

While shown and described herein as a method and system for managing development objects for computer program code, it is understood that the invention further provides various alternative embodiments. For example, in one embodiment, the invention provides a computer-readable medium that includes computer program code to enable a computer infrastructure to manage the development objects. To this extent, the computer-readable medium includes program code, such as development system 30 (FIG. 1), that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 29 (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to manage development objects for computer program code as described above. In this case, the service provider can create, maintain, support, etc., a computer infrastructure, such as computer infrastructure 12 (FIG. 1), that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for managing development objects for computer program code. In this case, a computer infrastructure, such as computer infrastructure 12 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more types of program products, such as an application/software program (e.g., an IDE), component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer implemented method of managing development objects for computer program code, the method comprising:
   obtaining a first development object that comprises source code for the computer program code, wherein the source code is written in a positional language and includes a set of lines, and wherein a meaning of a set of characters in a line is defined by a position of the set of characters within the line;
   obtaining a second development object that comprises a document object model (DOM), wherein the DOM includes:
      a set of model objects that corresponds to the set of lines; and
      a set of attributes associated with each model object in the set of model objects, and wherein each attribute in the set of attributes corresponds to a character position range of the corresponding line;
   using a set of synchronizer objects to synchronize the source code and the DOM based on a set of character position ranges defined by the positional language;
   generating a unique synchronizer object in the set of synchronizer objects for each line in the source code, wherein each synchronizer object in the set of synchronizer objects corresponds to a unique model object in the set of model objects.

2. The method of claim 1, wherein the obtaining a second development object step includes using the set of synchronizer objects to generate the DOM based on the source code.

3. The method of claim 1, further comprising generating the computer program code based on the DOM.

4. The method of claim 1, wherein the using step includes:
   receiving a modification of data for one of the set of attributes at the corresponding one of the set of synchronizer objects; and
   with the one of the set of synchronizer objects,
      selecting one of the set of lines based on the corresponding model object; and
      updating the data for the character range that corresponds to the one of the set of attributes on the selected line.

5. The method of claim 1, wherein the using step includes:
   receiving a modification of data for one of the set of lines at the corresponding one of the set of synchronizer objects; and
   with the one of the set of synchronizer objects,
      selecting one of the set of attributes for the corresponding model object based on a character position for the modification and the character position range that corresponds to each of the set of attributes; and
      updating the data for the selected one of the set of attributes.

6. A computer implemented method of managing development objects for computer program code, the method comprising:
   obtaining a first development object that comprises source code for the computer program code, wherein the source code is written in a positional language and includes a set of lines, and wherein a meaning of a set of characters in a line is defined by a position of the set of characters within the line;
   obtaining a second development object that comprises a document object model (DOM) that corresponds to the source code, wherein the DOM includes:
      a set of model objects, wherein each model object corresponds to a unique one of the set of lines; and
      a set of attributes for each model object, wherein each attribute in the set of attributes corresponds to a character position range of the corresponding line; and
   using a set of synchronizer objects to synchronize the source code and the DOM, wherein each synchronizer object in the set of synchronizer objects corresponds to a unique model object in the set of model objects.

7. The method of claim 6, wherein the using step includes:
   receiving a modification of data for one of the set of lines at the corresponding one of the set of synchronizer objects; and
   with the one of the set of synchronizer objects,
      selecting one of the set of attributes for the corresponding model object based on a character position for the modification and the character position range that corresponds to each of the set of attributes; and
      updating the data for the selected one of the set of attributes.

8. The method of claim 7, wherein the receiving step includes generating a source code editor for enabling a user to modify data for the set of lines.

9. The method of claim 6, wherein the using step includes:
   receiving a modification of data for one of the set of attributes at the corresponding one of the set of synchronizer objects; and
   with the one of the set of synchronizer objects,
      selecting one of the set of lines based on the corresponding model object; and
      updating the data for the character position range that corresponds to the one of the set of attributes on the selected line.

10. The method of claim 9, wherein the receiving step includes generating a visual editor for enabling a user to modify data for the set of attributes.

11. The method of claim 6, further comprising generating the computer program code based on the DOM.

12. The method of claim 6, wherein the obtaining a second development object step includes:
   for each line in the set of lines,
      generating a synchronizer object for the line;
      providing data for the line to the synchronizer object; and
      generating a model object and a set of attributes that correspond to the line using the synchronizer object.

13. The method of claim 12, wherein the generating a model object step includes:
   selecting one of a set of model object types based on the data;
   creating a new model object having the model object type; and
   obtaining data for each attribute in the set of attributes for the new model object based on the data for the line and the character position range for the attribute.

14. A system for managing development objects for computer program code, the system including at least one computing device including hardware, the system further comprising:

a system embodied on the at least one computing device for obtaining a first development object that comprises source code for the computer program code, wherein the source code is written in a positional language and includes a set of lines, and wherein a meaning of a set of characters in a line is defined by a position of the set of characters within the line;

a system embodied on the at least one computing device for obtaining a second development object that comprises a document object model (DOM) that corresponds to the source code, wherein the DOM includes;

a set of model objects wherein each model object corresponds to a unique one of the set of lines; and a set of attributes for each model object, wherein each attribute in the set of attributes corresponds to a character position range of the corresponding line;

a system embodied on the at least one computing device for using a set of synchronizer objects to synchronize the source code and the DOM, wherein each synchronizer object in the set of synchronizer objects corresponds to a unique model object in the set of model objects.

15. The system of claim 14, the at least one computing device further comprising a system for generating a source code editor for enabling a user to modify data for the set of lines.

16. The system of claim 14 the at least one computing device further comprising a system for generating a visual editor for enabling a user to modify data for at least one of the set of model objects.

17. The system of claim 14, wherein the system for obtaining the second development object includes:

a system for generating a set of attributes associated with each model object in the set of model objects; and a system for obtaining data for each attribute in the set of attributes based on data for a character position range on the corresponding line.

18. The system of claim 14 the at least one computing device further comprising a system for generating the computer program code based on the DOM.

19. A program product stored on one or more storage articles of manufacture, which when executed, manages development objects for computer program code, the program product comprising:

program code for obtaining a first development object that comprises source code for the computer program code, wherein the source code is written in a positional language and includes a set of lines, and wherein a meaning of a set of characters in a line is defined by a position of the set of characters within the line;

program code for obtaining a second development object that comprises a document object model (DOM) that corresponds to the source code, wherein the DOM includes;

a set of model objects wherein each model object corresponds to a unique one of the set of lines; and a set of attributes for each model object, wherein each attribute in the set of attributes corresponds to a character position range of the corresponding line;

program code for using a set of synchronizer objects to synchronize the source code and the DOM, wherein each synchronizer object in the set of synchronizer objects corresponds to a unique model object in the set of model objects.

20. The program product of claim 19, wherein the program product is embodied as an integrated development environment application for generating computer program code based on the positional language and the source code.

* * * * *